J. A. WORSHAM.
PNEUMATIC CONVEYER.
APPLICATION FILED MAY 22, 1915.
1,210,130.
Patented Dec. 26, 1916.
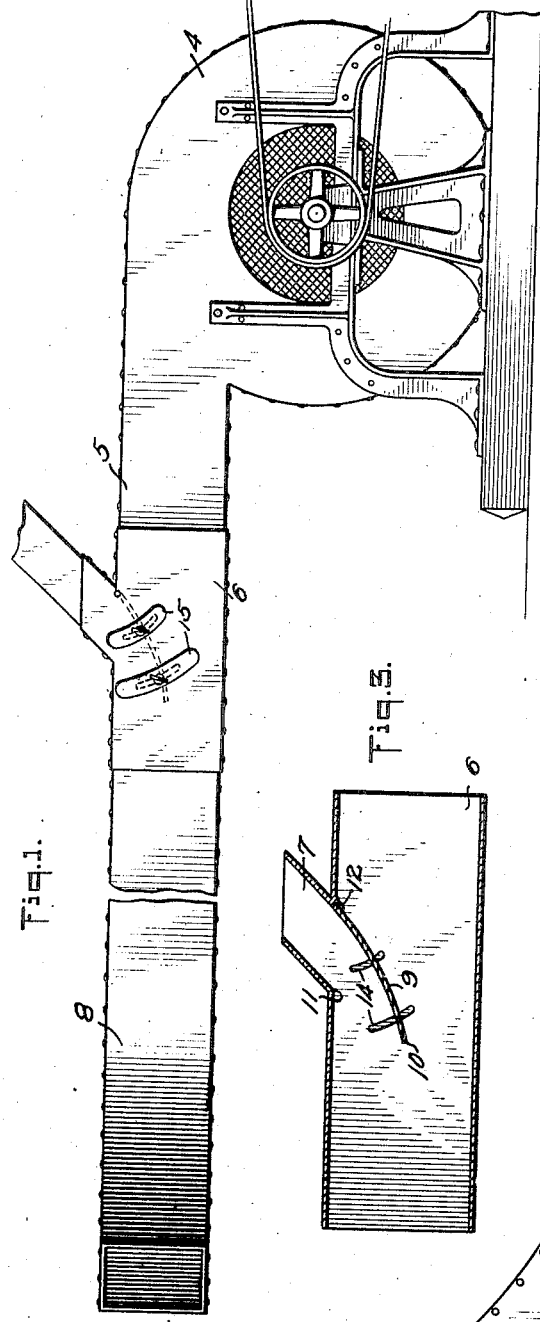
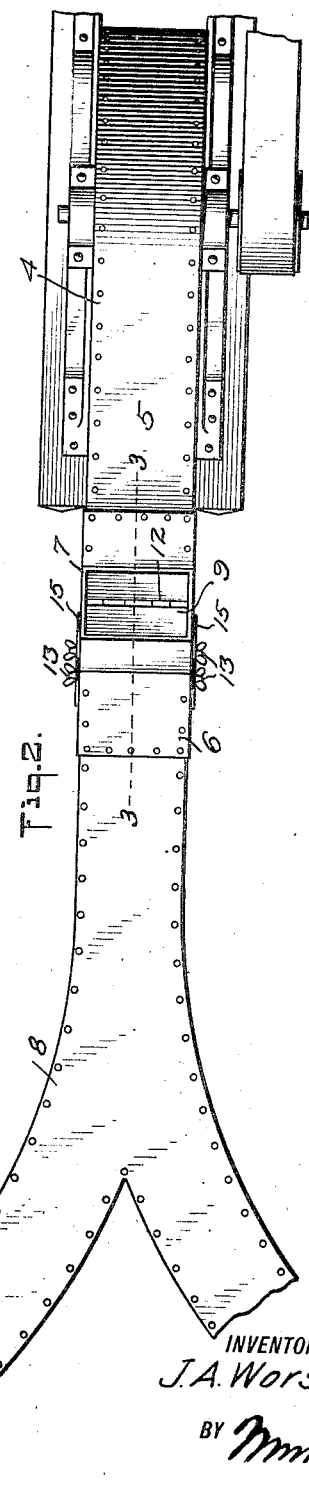
WITNESSES:
INVENTOR
J. A. Worsham.
BY
ATTORNEY

UNITED STATES PATENT OFFICE.

JAMES ALVIN WORSHAM, OF MAROA, ILLINOIS.

PNEUMATIC CONVEYER.

1,210,130.   Specification of Letters Patent.   Patented Dec. 26, 1916.

Application filed May 22, 1915. Serial No. 29,807.

*To all whom it may concern:*

Be it known that I, JAMES A. WORSHAM, a citizen of the United States, and a resident of Maroa, in the county of Macon and State of Illinois, have invented a new and Improved Pneumatic Conveyer, of which the following is a full, clear, and exact description.

My invention relates to pneumatic conveyers intended to feed granular material.

The object of the invention is to provide a simple, efficient and inexpensive pneumatic conveyer characterized by the provision of a baffle-plate at the inlet of the granular material into the air passage, and which baffle-plate extends beyond the inlet for the material.

The invention is further characterized by the provision of an adjustable baffle-plate at the inlet for the granular material into the air channel, whereby the size of the opening through which the material is fed into the air channel can be varied inversely to the pressure of air created in the channel at the point where the baffle-plate is provided.

With the above and other objects in view, the nature of which will more fully appear as the description proceeds, the invention consists in the novel construction, combination and arrangement of parts as herein fully described, illustrated and claimed.

In the accompanying drawings, forming part of the application, similar characters of reference indicate corresponding parts in all the views.

Figure 1 is a side elevation of a pneumatic conveyer embodying my invention; Fig. 2 is a plan view thereof; and Fig. 3 is a section on line 3—3, Fig. 2.

Referring to the drawings, 4 represents a blower of any suitable type which will force the air through the inlet end 5. Engaging the end 5 of the blower is a tubular casing 6 which has an inlet 7 at the top thereof for granular material. This inlet preferably extends through the entire width of the casing 6 and is inclined to the axis of the casing, so as to form an acute angle with the direction of air flowing therethrough. The casing 6 is provided with a spout 8 through which the granular material is delivered to the desired place. A double spout is shown in the drawings, whereby the grain is blown by means of the blower to both ends of the car. It is self-evident that for different receptacles different spouts may be associated with the tubular casing 6.

To prevent the air coming from the blower to the spout from entering the grain inlet 7, I provide a baffle-plate 9 which deflects the air from the grain inlet 7 as it comes from the blower to the spout. Said baffle-plate is preferably hinged at the top of the casing 6 to form the continuation of the wall of the inlet 7 nearest to the blower. The free end 10 of the baffle-plate 9 extends beyond the edge 11 of the inlet 7 remote from the blower 4. By extending the end 10 of the baffle-plate beyond the edge 11 of the inlet 7, back pressure within the grain inlet is prevented; and, further, due to the extension of the end 10 beyond the edge 11 in the space between the free end 10 and the edge 11 of the inlet 7, a suction is created, due to the sudden expansion of the passage at the left of the baffle-plate 9.

The hinge 12 of the baffle 9 is air tight, as are the joints formed by the sides of the baffle with the sides of the tubular casing 6. The baffle-plate 9 is controlled on its hinge by thumb screws 13 passing through slots 14 provided in the sides of the casing and engaging the baffle-plate. The slots 14 are normally covered by strips 15 carried by the thumb screws, whereby the said slots 14 are made air tight. It will be noted that when the baffle-plate 9 is moved on its hinge the cross-sectional area of the air channel at the end 10 will vary inversely to the cross-sectional area of the grain inlet formed by the said end within the air passage. That is to say, if a larger amount of grain is passing per unit of time into the casing 6, a higher pressure of air is used within the channel to move the grain, and vice versa. The baffle-plate 9 is preferably slightly curved, so as to give less resistance to the air coming from the blower to the spout, and also to discharge the grain coming into the inlet 7 at an angle as obtuse as possible to the direction of flow of the air.

From the above description it will be seen that by providing an adjustable baffle-plate which has an air-tight hinge and the free end of which extends a substantial distance beyond the farther edge of the feed opening, I obtain an efficient and easily controllable pneumatic conveyer.

I claim:

1. In a pneumatic conveyer, the combination of a tubular casing having an inlet for granular material, a blower associated with one end of said casing, a spout associated with the other end thereof, an adjustable baffle-plate within the casing at the inlet tending to deflect the air current flowing through the casing from the inlet, the end of the baffle-plate in its various operative positions extending beyond the inlet opening in the direction of the air flow within the casing, and means for adjusting the baffle-plate within the casing so that the size of the air passage within the casing can be varied inversely to the size of the inlet for granular material.

2. In a pneumatic conveyer, a tubular casing, means for directing air therethrough, said casing having an inlet for granular material, a baffle plate in the casing at the inlet for directing the granular material coming from the inlet into the casing and for deflecting the air flowing through the casing from the said inlet, said plate having a movable end extending beyond the inlet opening in the various operative positions of the plate, and means for adjusting said end of plate whereby the inlet opening is varied inversely to the cross section of the air passage within the casing at the movable end of said plate.

In testimony whereof I have signed my name to this specification in the presence of two subscribing witnesses.

JAMES ALVIN WORSHAM.

Witnesses:
SAM BRADEN, Jr.,
G. E. STOUTENBOROUGH.